March 8, 1966 SVEN-ERIK BACKLUND 3,238,830
DEVICE IN CUTTING MACHINES FOR CUTTING
FABRIC OR THE LIKE TO BANDS Filed Jan. 27, 1964 3 Sheets-Sheet 1

INVENTOR.
Sven-Erik Backlund
BY Sommers + Young
Attorneys

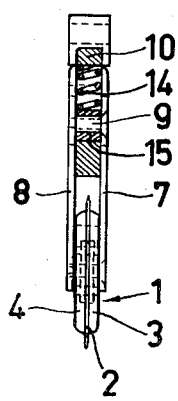
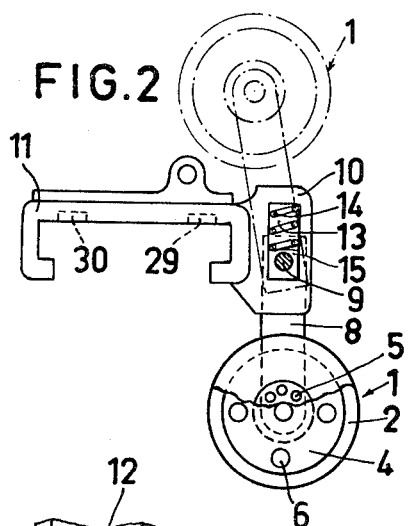
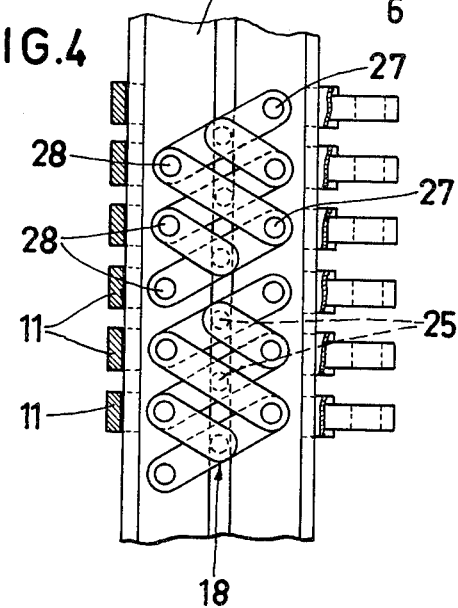

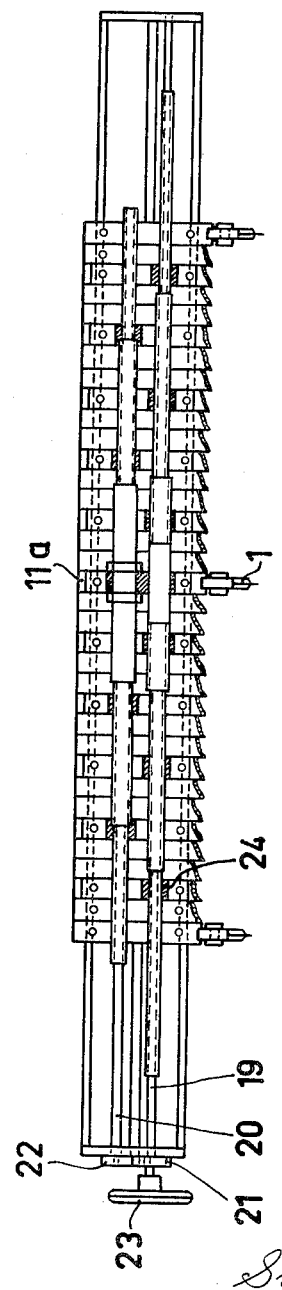

3,238,830
DEVICE IN CUTTING MACHINES FOR CUTTING
FABRIC OR THE LIKE TO BANDS
Sven-Erik Backlund, Uddevalla, Sweden, assignor to Sven
Gerhard Anderson, Ljungskile, Sweden
Filed Jan. 27, 1964, Ser. No. 340,373
Claims priority, application Sweden, Jan. 29, 1963,
977/63
12 Claims. (Cl. 83—426)

This invention relates to a device for use in cutting machines to cut fabric or the like, for example circular knitted hosiery, to bands, said device comprising a plurality of knives, preferably in the form of cutting rollers, which are adjustable transverse to the cutting direction and adapted to cooperate with one or several counter-cutting rolls.

The device according to the invention is substantially characterized in that the knives are arranged equally spaced on the links in a lazy tongs mechanism by means of which the distances between the knives can be adjusted while maintaining the equal spacing.

One or several of the knives are preferably positively guided by one or several screws with associated nuts. Said screws are preferably two in number, an intermediate knife being arranged stationary while the remaining knives are displaceable to the sides of the machine in that the screws are provided with threads of such pitch and direction that by rotation of the screws the desired adjusting movement of the knives is effected. It is, however, not necessary that all of the knives be positively guided by the screws. The lazy tongs mechanism may, for example, be divided into sets, in such a manner, that a free link end at each end of the set is connected to a knife guided by a screw while the remaining knives guided by the set are displaced merely by the help of the lazy tongs mechanism.

When the knives are so arranged that they can be moved into a non-operative position independently of each another, the lazy tongs mechanism and the screws need not be used for larger adjusting movements. In an arrangement of this type it is, for example, possible to double the band width by moving every second knife into the non-operative position and thereafter to carry out the fine adjustment by means of the screw and lazy tongs mechanism. In such a case the knives are preferably cutting rollers adapted to be moved by a swinging motion into and out of the contact with two parallel driven counter-cutting rolls. When springs are provided to press the knives against the counter-cutting rolls, no additional drive means for the knives are required. The double counter-cutting rolls ensure at the same time an effective cutting of the fabric.

Due to the characterizing feature of the invention, that is, the mounting of the knives on a lazy tongs mechanism, the band width can be adjusted rapidly. Furthermore, the construction can be very simple, without jeopardizing the safety of operation. By the combination of the lazy tongs mechanism with the adjusting screws, a greater precision in adjusting the band width is obtained. By the arrangement of tilting knives the adjusting speed at greater adjustments of the band width can be increased still more, without deteriorating effect on the precision.

The invention will be described in greater detail in the following, reference being had to the accompanying drawings showing by way of an example an embodiment of the invention.

FIGS. 2 and 3 are a side view and a front view, respectively, of a knife in the form of a cutting roll mounted on a runner.

FIG. 4 is a plan view of a guide beam wherein the lazy tongs mechanism which characterizes the invention is guided, which beam is also intended to support and guide the runners with the knives.

FIG. 5 is a horizontal view of two screws which together with the lazy tongs mechanism are adapted to effect the adjusting movement of the runners and, thus, of the knives.

Figure 1:
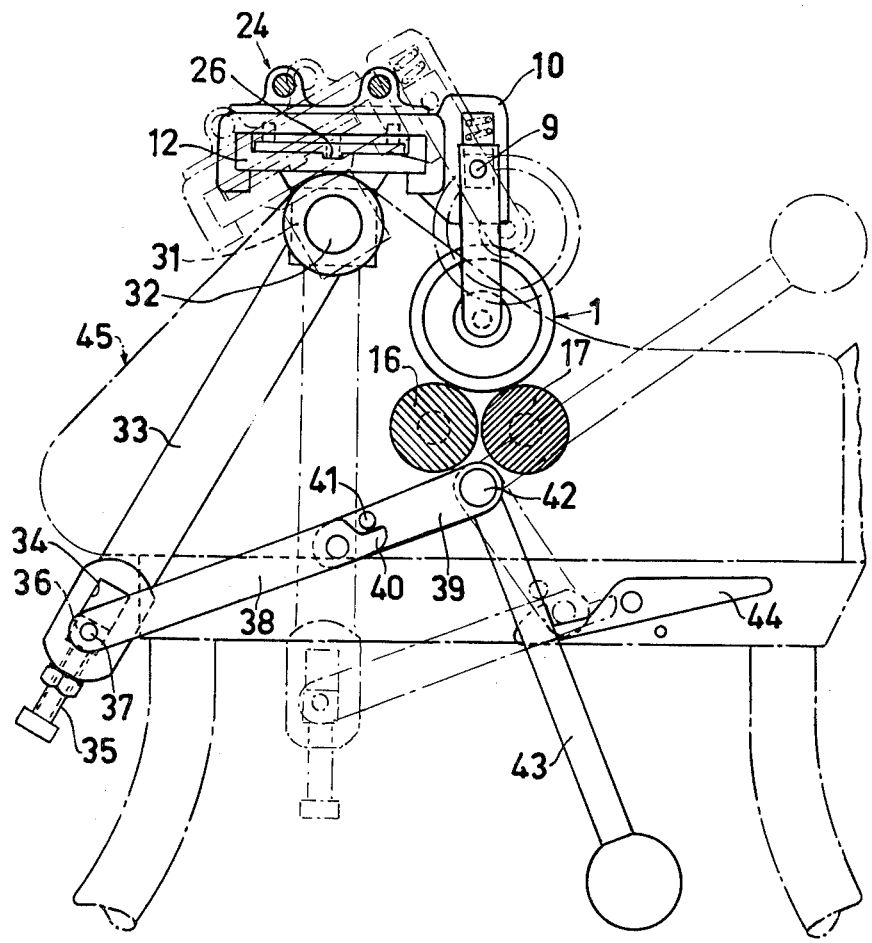
FIG. 1 shows in a schematic manner a side view of a cutting mechanism with adjusting means.

The device shown by way of an example is substantially intended for cutting circular knitted hosiery to bands and comprises to this end a plurality of laterally displaceable knives 1, each of which consists of a round disc-shaped, ground and hardened cutter 2 enclosed between two bearing halves 3 and 4, FIG. 3, and, together with their respective bearing halves are rotatably mounted on ball bearings 5. The bearing halves 3 and 4 are secured on the sides of the cutters 2 by screws 6. The knives are swingably mounted by arms 7 and 8 on bolts 9 which serve as swivel axis in brackets 10, said brackets being connected to runners 11 displaceably mounted on a guide beam 12. On their front side, i.e. according to FIG. 1 on their right-hand side, the brackets 10 are provided with vertical grooves 13 each of which contains a spring 14 and a block 15 through which extends a bolt 9 projecting at its ends from their respective blocks. The spring 14 is intended to press the knife 1 against two counter-cutting rolls 16 and 17.

In said guide beam 12 which, in the embodiment shown, is U-shaped, a lazy tongs type linkage mechanism 18 is provided which is divided into sets each comprising six links connected in groups of three, in such a manner, that at each end of the set a free link end is connected with a runner or traveler 11 adapted to be positively guided by either of two screws 19 and 20 which by way of two cog wheels 21 and 22 can be turned by an adjusting wheel 23. On the said positively guided runners 11 interiorly threaded bearing blocks or nuts 24 serving as or comprising nuts are provided to effect the displacement of the runners 11 and thereby of the knives 1 upon rotation of the screws 19 and 20, FIG. 5, in that said screws are immovably mounted in an intermediate stationary runner 11a and in the machine stand 45 indicated by dash-dotted lines. Of the runners 11, counting them from the centre and disregarding the stationary runner 11a, the third, ninth and fifteenth runners are positively guided by the screw 19 which for this purpose is provided with six different right-hand and left-hand threads having a pitch of, for example, 0.5, 1.5 and 2.5 mm. In a corresponding manner, the sixth and the twelfth runners are guided by the screw 20 which in the above example is provided with four different right-hand and left-hand threads having a pitch of 1.0 and 2.0 mm.

The central pins 25 of the lazy tongs mechanism or elongations of said pins are guided by a groove 26 in the guide beam 12. Its outer pins 27 and 28 or elongations thereof project into grooves 29 and 30 in the runners 11 and can be displaced in said grooves in a direction perpendicular to the elongation and at the same time transfer the adjusting movement from the runners positively guided by the screws to the remaining runners.

FIG. 1 illustrates by dashed lines how the knives 1 together can be moved into a non-operative position by means of a lever mechanism which is operated, for example, when a new fabric is to be fed in between the knives and the counter-cutting rolls, said mechanism being mounted on journal 32 in the machine stand 45 and adapted to swing a square shaft 31 with the guide beam 12 mounted thereon. To the said square shaft 31 one end of a lever 33, constituting part of said lever mechanism, is attached, which lever is provided at its other end with a groove 34. In said groove 34 a square portion 36 displaceable by a turnscrew 35 is provided with a pivot 37 for one end of a second lever mechanism comprising two parts 38 and 39. Said parts 38 and 39 are articulated with one another and provided in their joint with a lock which in the operative position of the knives relative to the counter-cutting rolls abut to a pin 41. The other end of the levers 38, 39 is pivoted about a pin 42 in the machine stand 45 and is at this end nonrotatably secured to an operating lever 43 pivoted about pin 42. Upon turning said operating lever upwards in FIG. 1 into the position indicated by dash-dotted lines, the square shaft 31 and thereby the guide beam 12 are turned via the lever mechanism, so that the knives 1 are removed from the counter-cutting rolls 16 and 17. In the most upward position the joint between the lever parts 38, 39 engages with a lock 44 thus maintaining the device in this locking position.

FIG. 2 shows in a corresponding manner by dashed lines how every individual knife can be moved into a non-operative position by being turned about the bolt 9. The individual knives are swung independently of one another, so that, for example, every second knife may remain in the operative position, whereby the band width can be doubled or changed to another dimension independently of the screw mechanism. The spring 14 presses in the said operative position the knife down into the "cradle" formed between the counter-cutting rolls 16 and 17, thus rendering a special locking means for the knives in the operative position normally unnecessary. In addition, the engaging pressure of the knives against the counter-cutting rolls can be adjusted by the turnscrew 35.

The invention is not restricted to the afore-described embodiments thereof, but may be modified within the scope of the following claims. It is, for example, not necessary to use two screws. In certain cases it may be suitable to use only one screw and in other cases several screws. The screws may possibly also be exchanged against other adjusting means cooperating in like manner with the lazy tongs mechanism. It is neither necessary that the knives are given the form of cutting rollers. Even non-rotary knives may, thus, be used, as well as even other modifications are imaginable within the scope of the invention.

What I claim is:

1. A device for use in cutting machines for cutting fabrics into bands comprising at least one rotatable cutter disc means, at least two counter-cutting rolls arranged parallel to each other, means for pressing said cutter disc means against the fabric and against said counter-cutting rolls, and means driving said counter-cutting rolls at the same peripheral speed as each other, the pressing of said cutter disc means against said counter-cutting rolls causing said rolls to drive said cutter disc means.

2. Apparatus according to claim 1, and in which mounting means for said cutter disc, and at least one screw and nut means is provided for operatively engaging and positively guiding at least one of said cutter discs, in which said cutter disc mounting means are provided with means for pivotally supporting said cutter discs individually, in which said means for pressing said cutter disc means against said fabric and said counter-cutting rolls includes individual means; in which a U-shaped guide beam is provided on which said screw-and-nut means and said lazy tongs are arranged, and runners are mounted on and controlled by said U-shaped beam, in which said cutter discs are mounted in said runners, respectively, and in which a shaft is provided about which said guide beam and thereby said cutter discs are pivoted, said fabric cutting apparatus having a main frame, said shaft being mounted in said main frame, and lever means fastened to said shaft for adjusting said shaft by positive rotation between a position in which said cutter discs are in operative relation with said counter-cutting roll and a position in which said cutter discs are in non-operative relation with said counter-cutting rolls.

3. In apparatus for cutting fabric into bands, a plurality of cutter discs, means adjustably mounting said cutter discs for movement transversely of the longitudinal direction of extent of said bands, said mounting and adjusting means comprising a lazy-tongs linkage mechanism on which said discs are mounted at equally spaced intervals and by which said equal spacing of said discs is maintained as the lateral spacing is adjusted, and at least two counter-cutting rolls are provided for cooperation with each of said cutting discs in the cutting.

4. Apparatus according to claim 3, and in which said adjusting means also comprises at least one screw-and-nut means operatively engaging and positively guiding at least one of said cutter discs, said screw-and-nut means extending parallel to said counter-cutting rolls.

5. Apparatus according to claim 4, and in which said lazy-tongs linkage mechanism is divided into groups of pivoted links, said groups having a free link end at each of their respective ends, each of which free link ends is connected with one of said screw-guided cutter discs, the other cutter discs of said group being guided only by said lazy-tongs linkage mechanism.

6. Apparatus according to claim 4 and in which a U-shaped guide beam is provided on which said screw-and-nut means and said lazy tongs are arranged, in which runners are mounted on and controlled by said U-shaped beam and, said cutter discs are mounted in said runners, respectively.

7. Apparatus according to claim 6, and in which said lazy-tongs linkage is comprised of links having central pivots provided with elongations, and said guide beam is provided with a longitudinal groove receiving said elongations.

8. Apparatus according to claim 6, and in which said lazy-tongs linkage is comprised of links having pivot pins connecting outer ends of some of said links, said pivot pins having elongations, in which said runners are provided with grooves extending transversely of the direction of movement of said pins, and said elongations of said pivot pins are received in said grooves.

9. Apparatus according to claim 3, and in which said adjusting means comprises a plurality of screws, each screw operatively engaging with and controlling the adjustment of a plurality of said cutter discs each of said screws being provided with the threads of special pitch and hand for each of its controlled cutter discs corresponding to the desired adjustment settings of the respective cutter discs.

10. Apparatus according to claim 9, and in which a centrally located one of said cutter discs is mounted stationarily and one each of said plurality of screws is located on an opposite side of said stationary cutter disc from the other, and said oppositely located screws have opposite hand.

11. Apparatus according to claim 3, and in which means are provided for moving the individual cutter discs into non-operative positions, said cutter disc mounting means being provided with means for pivotally supporting said cutter discs individually, and in which means is provided for individually bringing said cutter discs into and out of operative engagement with respect to said counter-cutting rolls by individual pivotal movement.

12. Apparatus according to claim 11, and in which individual spring means are provided for pressing said cutter discs against said counter-cutting rolls, and means are provided for imparting driving force to said cutter discs through said counter-cutting rolls.

References Cited by the Examiner

UNITED STATES PATENTS

| | | | |
|---|---|---|---|
| 263,983 | 9/1882 | Spooner | 83—482 |
| 325,812 | 9/1885 | Bridgman | 83—499 |
| 1,316,215 | 9/1919 | Amdursky et al. | 83—700 X |
| 1,510,656 | 10/1924 | Clements | 83—504 X |
| 2,208,834 | 7/1940 | Criner | 146—153 X |
| 2,212,457 | 8/1940 | Schrier | 83—482 |
| 2,479,908 | 8/1949 | Criner | 146—153 |
| 2,713,903 | 7/1955 | Smith | 83—499 |
| 2,897,893 | 8/1959 | Rockstrom et al. | 83—482 |

FOREIGN PATENTS 619,544  10/1935  Germany.

WILLIAM W. DYER, JR., *Primary Examiner.*

ANDREW R. JUHASZ, *Examiner.*